US008182035B2

(12) United States Patent
Hartenstine et al.

(10) Patent No.: US 8,182,035 B2
(45) Date of Patent: May 22, 2012

(54) IMPACT ABSORBING CHILD SAFETY SEAT

(75) Inventors: Curtis M. Hartenstine, Birdsboro, PA (US); Michael H. Gillett, Reinholds, PA (US)

(73) Assignee: Wonderland Nurserygoods Co., Ltd., Neihu, Taipei (TW)

( * ) Notice: Subject to any disclaimer, the term of this patent is extended or adjusted under 35 U.S.C. 154(b) by 122 days.

(21) Appl. No.: 12/370,613

(22) Filed: Feb. 13, 2009

(65) Prior Publication Data

US 2009/0322130 A1    Dec. 31, 2009

Related U.S. Application Data

(60) Provisional application No. 61/075,337, filed on Jun. 25, 2008.

(51) Int. Cl.
*B60N 2/28* (2006.01)
*B60N 2/42* (2006.01)
*A47C 1/11* (2006.01)

(52) U.S. Cl. ............ 297/256.13; 297/216.11; 297/250.1

(58) Field of Classification Search ............... 297/250.1, 297/256.16, 216.11, 256.13
See application file for complete search history.

(56) References Cited

U.S. PATENT DOCUMENTS

| 4,632,456 A * | 12/1986 | Kassai ......................... 297/328 |
| 4,754,999 A | 7/1988 | Kain |
| 5,228,746 A | 7/1993 | Burleigh |
| 5,496,092 A | 3/1996 | Williams |
| 5,997,086 A | 12/1999 | Gibson |
| 6,152,525 A | 11/2000 | Carine et al. |
| 6,491,348 B1 * | 12/2002 | Kain .............................. 297/484 |
| 6,513,870 B1 | 2/2003 | Takizawa |
| 6,857,700 B2 * | 2/2005 | Eastman et al. ............ 297/250.1 |
| 7,229,132 B2 * | 6/2007 | Meeker et al. ............. 297/250.1 |
| 7,261,376 B2 * | 8/2007 | Kespohl .................... 297/256.13 |
| 7,625,043 B2 * | 12/2009 | Hartenstine et al. ....... 297/250.1 |
| 2003/0151282 A1 | 8/2003 | Williams |
| 2007/0057546 A1 | 3/2007 | Chen |

FOREIGN PATENT DOCUMENTS

| DE | 693 12 495 T2 | 3/1998 |
| EP | 0 927 659 A | 7/1999 |
| JP | S5954325 U | 4/1984 |
| JP | H0268223 U | 5/1990 |
| JP | H039927 U | 1/1991 |
| JP | H0567533 U | 9/1993 |
| JP | H07509148 A | 10/1995 |
| JP | H0858445 A | 3/1996 |
| JP | 200147904 A | 2/2001 |
| JP | 2001150991 A | 6/2001 |

(Continued)

*Primary Examiner* — David Dunn
*Assistant Examiner* — Tania Abraham
(74) *Attorney, Agent, or Firm* — Winston Hsu; Scott Margo

(57) ABSTRACT

The present invention provides a child safety seat. The child safety seat comprises a seat body and an impact absorbing mechanism. The seat body comprises a backrest part and a seat part, and the impact absorbing mechanism is connected to a bottom surface of the seat part. The impact absorbing mechanism comprises at least two protruding parts positioned on a rear part of the impact absorbing mechanism and protruding from the bottom surface of the seat part. The rear part is near the backrest part of the seat body. When the child safety seat is positioned on a car seat and contacts the car seat, the protruding parts are utilized for reducing impact force received from the car seat when the child safety seat encounters an impact.

14 Claims, 4 Drawing Sheets

FOREIGN PATENT DOCUMENTS

| | | |
|---|---|---|
| JP | 2001199267 A | 7/2001 |
| JP | 20022347 A | 1/2002 |
| JP | 200363292 A | 3/2003 |
| JP | 2003525807 A | 9/2003 |
| JP | 2005219732 A | 8/2005 |
| JP | 2005313888 A | 11/2005 |
| KR | 1020010039923 A | 5/2001 |
| WO | 9321871 | 11/1993 |
| WO | 9412806 | 6/1994 |
| WO | 0166380 | 9/2001 |

* cited by examiner

IMPACT ABSORBING CHILD SAFETY SEAT

CROSS REFERENCE TO RELATED APPLICATIONS

This non-provisional application claims the benefit of U.S. provisional application No. 61/075,337, filed on Jun. 25, 2008 and included herein by reference.

BACKGROUND OF THE INVENTION

1. Field of the Invention

The present invention relates to a child safety seat, and more particularly, to a child safety seat capable of utilizing simple structure to reduce impact force.

2. Description of the Prior Art

In general, a traditional child safety seat does not have good protection effect for a child sitting on it when it encounters outside impact. The traditional child safety seat usually has a complicated structure. Thus, the traditional child safety seat has problems of high cost and low safety performance.

SUMMARY OF THE INVENTION

Therefore, one of the objectives of the present invention is to provide a child safety seat capable of utilizing simple structure to reduce impact force, to solve the above problems.

According to one embodiment of the present invention, a child safety seat is disclosed. The child safety seat comprises a seat body and an impact absorbing mechanism. The seat body comprises a backrest part and a seat part, and the impact absorbing mechanism is connected to a bottom surface of the seat part. The impact absorbing mechanism comprises at least two protruding parts positioned on a rear part of the seat part and protruding from the bottom surface of the seat part. When the child safety seat is positioned on a car seat and contacts the car seat, the protruding parts are utilized for reducing impact force received from the car seat when the child safety seat encounters an impact.

Briefly summarized, the child safety seat disclosed by the present invention can utilize simple structure to reduce the impact force, and thus the child safety seat of the present invention has advantages of low cost and high safety protection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
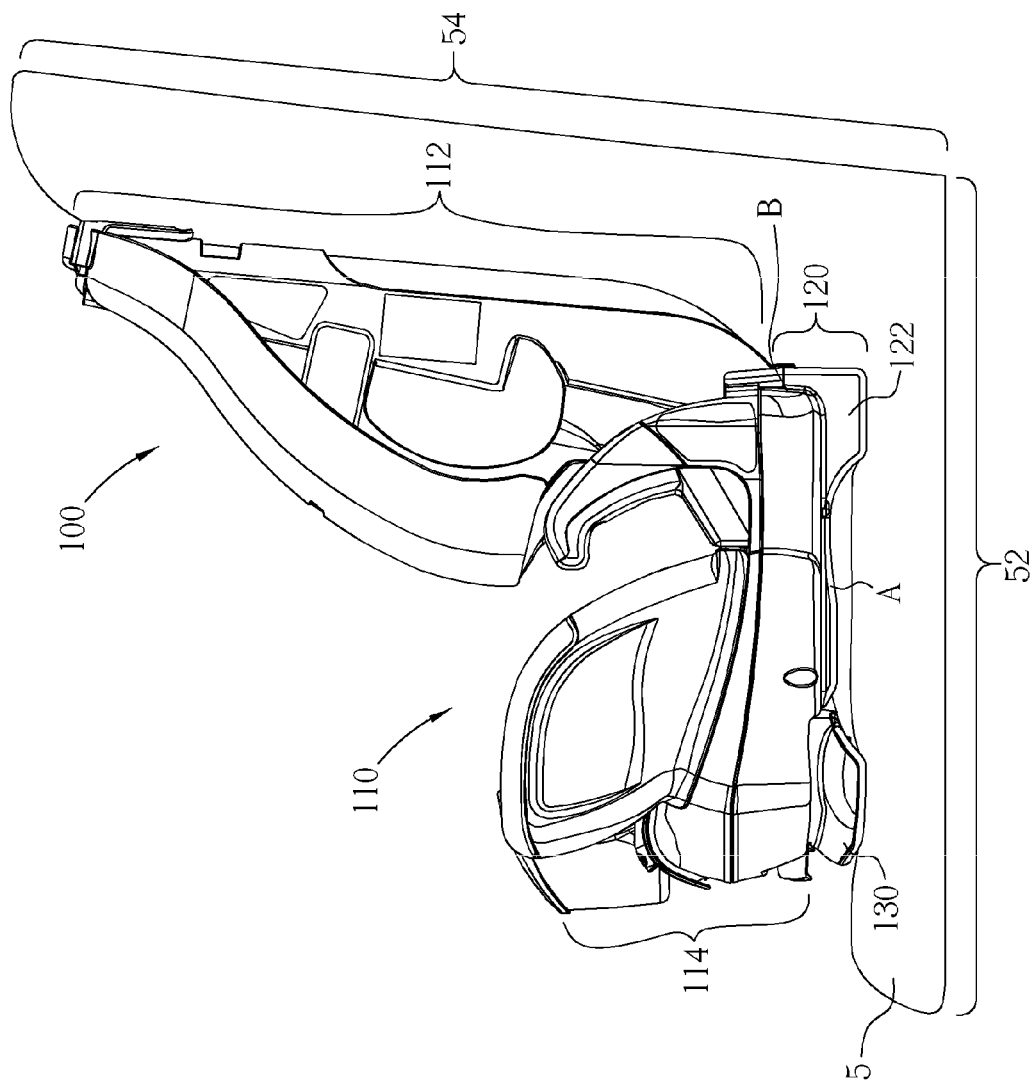
FIG. 1 is a side-view diagram of a child safety seat according to an embodiment of the present invention.
Figure 2:
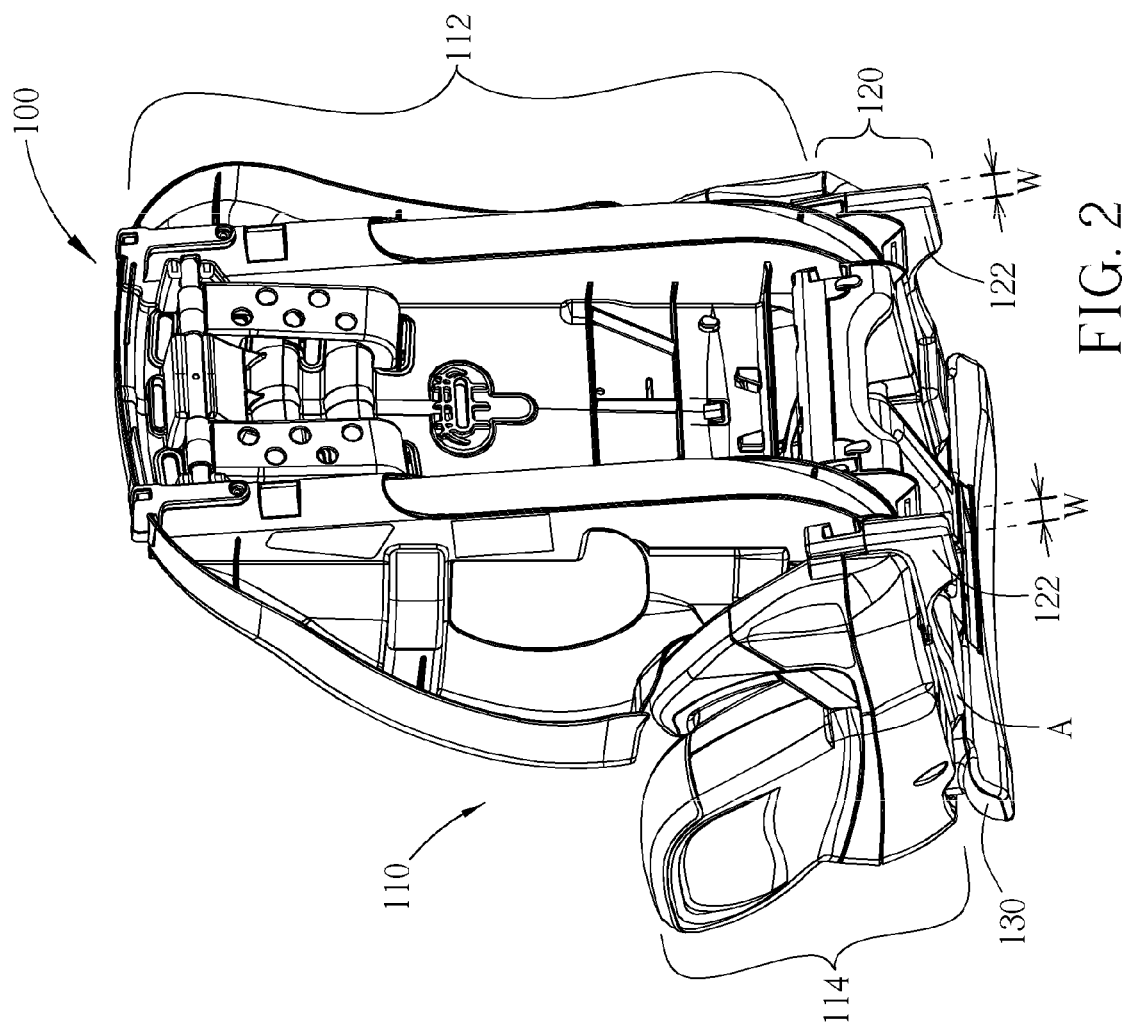
FIG. 2 is a three-dimensional diagram of the child safety seat according to the embodiment of the present invention.

Please refer to FIG. 1 and FIG. 2. FIG. 1 and FIG. 2 are a side-view diagram and a three-dimensional diagram of a child safety seat 100 according to an embodiment of the present invention. As shown in FIG. 1 and FIG. 2, the child safety seat 100 comprises a seat body 110 and an impact absorbing mechanism 120. The seat body 110 comprises a backrest part 112 and a seat part 114, and the impact absorbing mechanism 120 is connected to a bottom surface A of the seat part 114. The impact absorbing mechanism 120 comprises two protruding parts 122 positioned on a rear part of the seat part 114 and protruding from the bottom surface A of the seat part 114; that is, the protruding parts 122 are near the backrest part 112 of the seat body 110. Each protruding part 122 is positioned on each of two sides of the rear part of the seat part 114. However, this is only for an illustrative purpose and is not meant to be a limitation of the present invention. The number, interval, and relative position of the protruding parts are not limited as long as the protruding parts are positioned on the bottom surface A of the seat part 114 and positioned on the rear part.

Please refer to FIG. 1, when the child safety seat 100 is positioned on a car seat 5, the protruding parts 122 are utilized for contacting the car seat 5. When an impact occurs, the protruding parts 122 will let the child safety seat 100 be easy to nest into the car seat 5. In this way, the child safety seat 100 can be positioned on the car seat 5 stably and a buffer space can be formed between the seat part 114 and the car seat 5. The cushion of the car seat 5 can absorb impact energy to reduce impact energy received by a child in the child safety seat 100. In other words, when a child sits on the child safety seat 100, the child safety seat 100 of the present invention can reduce casualties caused by undue impact force on the child.

Figure 3:
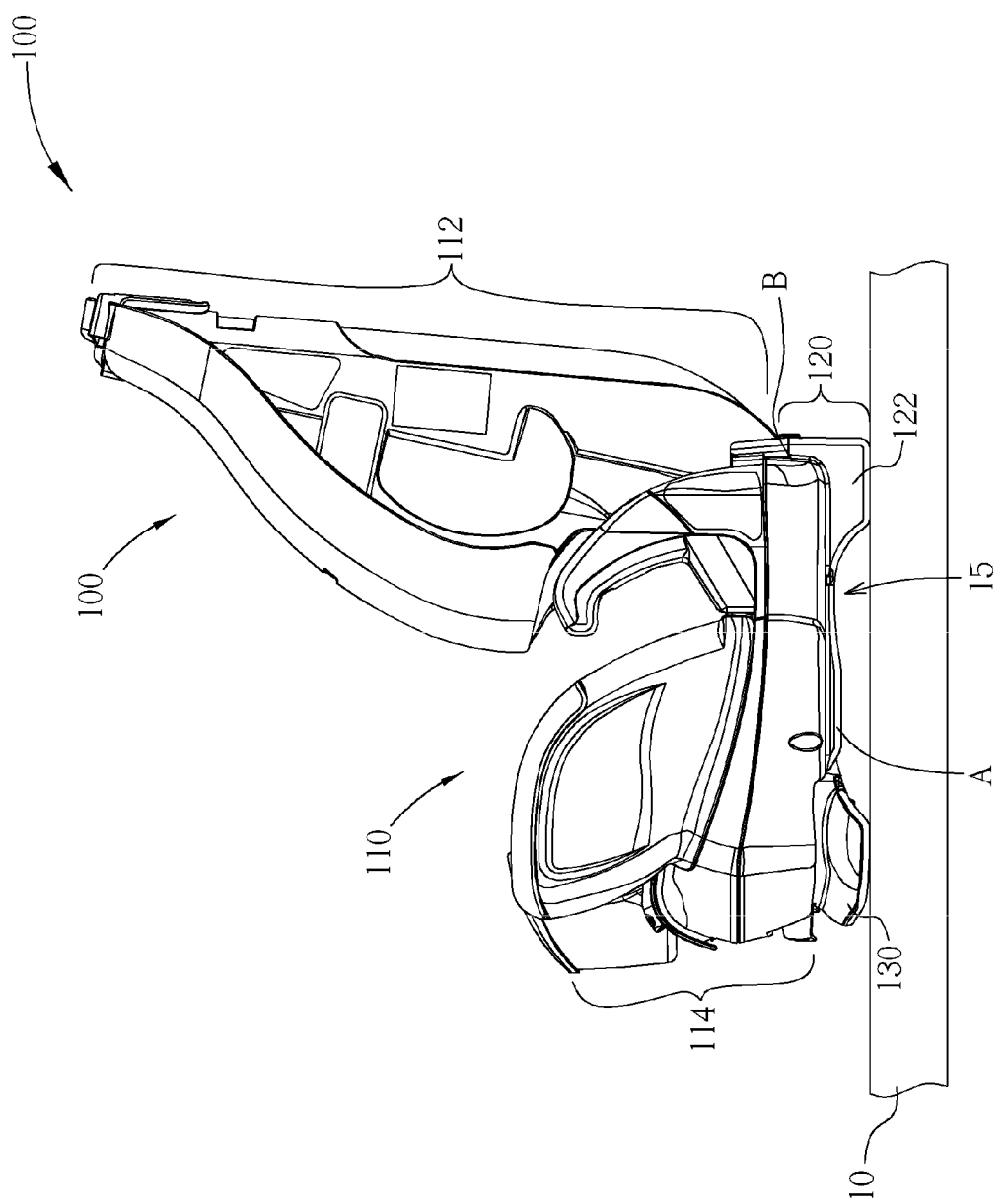
FIG. 3 is a side-view diagram of the child safety seat according to the embodiment of the present invention.

In addition, the impact absorbing mechanism 120 further comprises a foot base as shown in FIG. 3. The foot base 130 is positioned in a front part of the bottom surface A of the seat part 114 and protruding from the bottom surface A of the seat part 114. When the child safety seat 100 rests on a horizontal surface 10, only the protruding parts 122 and the foot base 130 contact the horizontal surface 10. As shown in FIG. 3, a space 15 is formed between the protruding parts 122 and the foot base 130. In other words, the bottom surface A of the seat part 114 is lifted and only bottom surfaces of the protruding parts 122 and the foot base 130 contacts the surface of the car seat 5. In this way, the contact area between the child safety seat 100 and the car seat 5 in FIG. 1 becomes smaller to produce better energy absorbing effect.

Preferably, the protruding parts 122 are further protruding from not only a bottom surface A of the seat part 114 but from the rear side surface B of the seat part 114 as shown in FIG. 1, so the child safety seat 100 can nest into not only the seat part 52 but into the backrest part 54 of the car seat 5 more easily. Therefore, more energy can be absorbed upon impact occurring.

Figure 4:
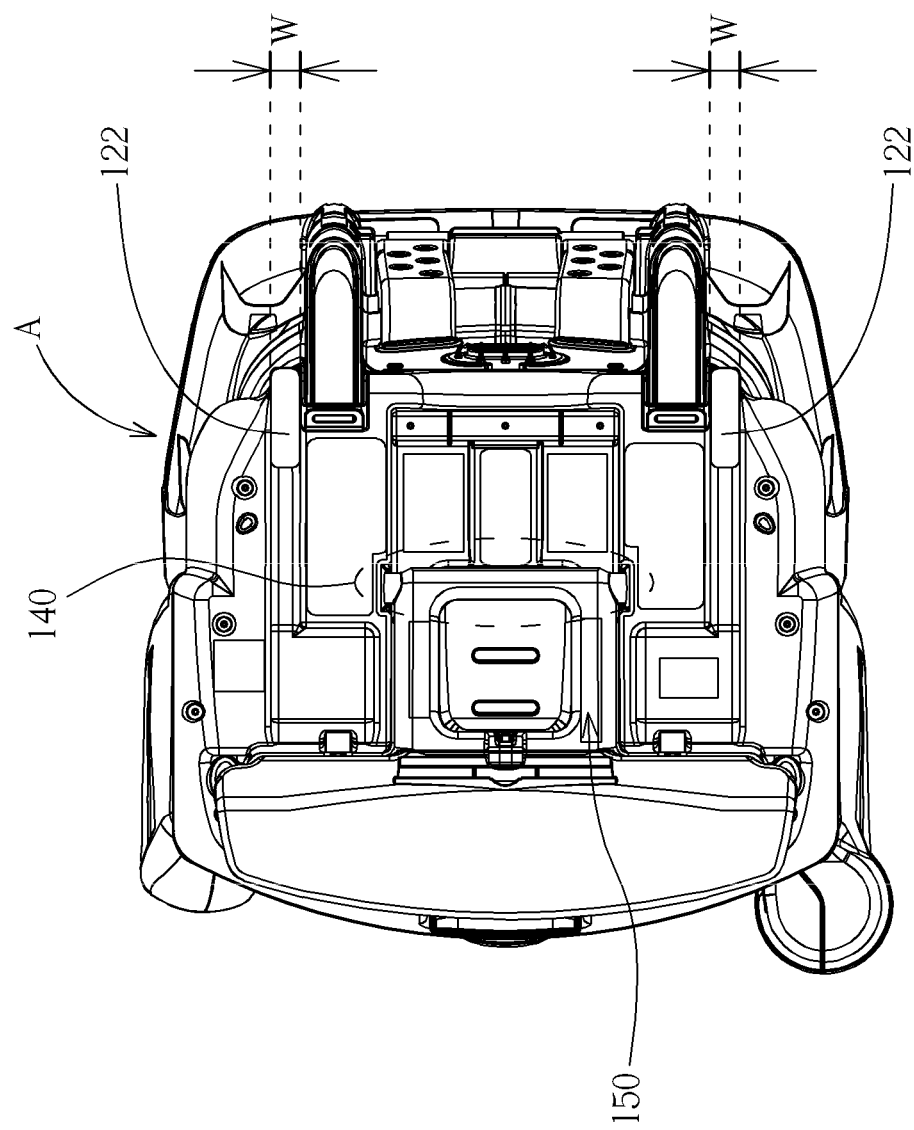
FIG. 4 is a two-dimensional diagram of the bottom surface of the child safety seat according to the embodiment of the present invention.

Please refer to FIG. 4. FIG. 4 is a two-dimensional diagram of the bottom surface A of the child safety seat 100 according to the embodiment. The foot base 130 is a recliner such that it is rotatably positioned on the seat part 114 by pivot 140, so the foot base 130 can adjust reclining angle of the seat part 114 relative to seat part 52. Preferably, the rotating pivot 140 is positioned in a trench 150 on the bottom surface of the seat part 114 and the rotating pivot 140 is positioned near a trench bottom of the trench 150. In this way, the contact area between the foot base 130 and the seat part 114 can be smaller. Thus, the foot base 130 of the embodiment can adjust the reclining angle of the seat part 114 to make child feel more comfortable in the child safety seat 100 and reduce the contact area between the seat part 114 and the car seat 5.

In addition, preferably, the rotating pivot 140 is practically positioned in a center of the seat part 114 in lengthy direction (between the front end and rear end of the seat part 114), and it is also practical to reduce the contact area between the seat part 114 and the car seat 5 after the foot base 130 is adjusted downward.

The contour of bottom surface of the protruding parts 122 can be designed to be various shapes, such as rectangles, ellipses, circles, and squares. Please refer to FIG. 2 or FIG. 4. When the width W of the protruding parts 122 ranges between 0.1 inch and 1 inch, and preferably between 0.125 inch and 0.75 inch, a better impact absorbing effect can be attained during test according to the embodiment.

More specifically, since cross-sectional area of the protruding parts 122 is much smaller than that of the bottom surface A of the seat part 114, the child safety seat 100 of the present invention will show the improvement of protection in an impact test. Thus, the impact energy received by a child in the child safety seat 100 will be reduced efficiently. In addition, please refer to FIG. 2 or FIG. 4. When the width W of the protruding parts 122 for contacting the car seat 5 is between 0.125 inch and 0.75 inch, more impact force can be reduced by child safety seat 100 of present embodiment during the impact test.

Please refer to Table. 1. Table. 1 shows the comparison of statistics of Gs(gravity) obtained by testing a child safety seat with the protruding parts and a child safety seat without the protruding parts. As shown in Table. 1, for a 12-month-old dummy (22 pounds), the resultant average Gs value of the child safety seat with the protruding parts is 48.1 (Gs), and the standard deviation of Gs value is 2.76 (Gs). On the other hand, the resultant average Gs value of the child safety seat without the protruding parts is 64.2 (Gs), and the standard deviation of Gs value is 10.41 (Gs). Thus, the testing data shows that the resultant Gs value of the child safety seat with the protruding parts is obviously lower and relatively stable. The same result can be observed from the testing statistics for a 6-year-old dummy (51.6 pounds). Thus, the child safety seat with the protruding parts can be proved to perform a better and stable impact energy absorbing effect.

TABLE 1

| | child safety seat with the protruding parts | | child safety seat without the protruding parts | |
|---|---|---|---|---|
| | Dummy age | | | |
| | 12-month-old | 6-year-old | 12-month-old | 6-year-old |
| Gs average value (Gs) | 48.1 | 44.6 | 64.2 | 51.4 |
| standard deviation of Gs value (Gs) | 2.76 | 2.42 | 10.41 | 3.76 |

In addition, the impact absorbing mechanism 120 and the protruding parts 122 thereof can be formed integrally by injection forming, and the protruding parts 122 can be formed on the bottom surface A of the seat part 114. It is also practical to fabricate the protruding parts 122 as independent elements, and form installation parts (not shown) on the bottom surface A of the seat part 114, and connect the protruding parts 122 to the bottom surface A. The configuration and size of the protruding parts 122 can be changed. In the impact test, the configuration and size of the protruding parts 122 used in FIG. 1 and FIG. 2 can reduce more impact force. Please note that the above embodiment is only for an illustrative purpose and is not meant to be a limitation of the present invention.

Briefly summarized, the child safety seat disclosed by the present invention can utilize simple structure to reduce the impact force, and thus the child safety seat of the present invention has advantages of low cost and high safety performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat, comprising:
   a seat body, having a backrest part and a seat part;
   a foot base positioned in a front part of the seat part and protruding from a bottom surface of the seat part and adjustable relative to the seat part so as to position the seat part in different recline angles; and
   an impact absorbing mechanism, connected to the bottom surface of the seat part, and independent from the foot base, wherein the foot base is independently movable with respect to the impact absorbing mechanism, the impact absorbing mechanism comprising at least two protruding parts positioned on a rear part of the seat part and protruding from the bottom surface of the seat part;
   wherein when the child safety seat is positioned on a car seat and is arranged forward-facing relative to the car seat, the protruding parts contact with the car seat and nest into the car seat while a collision occurs to absorb impact from the child safety seat via the protruding parts, and the contacting area between the protruding parts and the car seat is reduced after the foot base is adjusted downward.

2. The child safety seat of claim 1, wherein contour of bottom surface of the protruding parts contacting with the car seat are rectangles, ellipses, circles, or squares.

3. The child safety seat of claim 1, wherein width of the protruding parts is between 0.1 inch and 1 inch.

4. The child safety seat of claim 3, wherein width of the protruding parts is between 0.125 inch and 0.75 inch.

5. The child safety seat of claim 1, wherein the protruding parts and the seat part are formed integrally.

6. The child safety seat of claim 1, wherein when the child safety seat is disposed on a horizontal surface, only the protruding parts and the foot base contact the horizontal surface to form a space between the protruding parts and the foot base.

7. The child safety seat of claim 1, wherein the foot base is rotatably connected to the seat part via a rotating pivot.

8. The child safety seat of claim 7, wherein the rotating pivot is positioned in a trench on the bottom surface of the seat part.

9. The child safety seat of claim 8, wherein the rotating pivot is positioned near a bottom of the trench.

10. The child safety seat of claim 7, wherein the rotating pivot is substantially positioned in a center portion of the seat part.

11. The child safety seat of claim 1, wherein the protruding parts are protruding from a rear surface of the seat part.

12. The child safety seat of claim 1, wherein the protruding parts are respectively positioned on two sides of the bottom surface of the seat part.

13. A child safety seat, comprising:
   a seat body, having a backrest part and a seat part;
   a foot base positioned in a front part of the seat part and protruding from a bottom surface of the seat part and adjustable relative to the seat part so as to position the seat part in different recline angles; and
   an impact absorbing mechanism, connected to the bottom surface of the seat part, and independent from the foot base, wherein the foot base is independently movable with respect to the impact absorbing mechanism, the impact absorbing mechanism comprising at least two protruding parts positioned on a rear part of the seat part and protruding from the bottom surface of the seat part, wherein a lateral width of the protruding parts is between 0.1 inch and 1 inch for affecting impact absorption;

wherein when the child safety seat is positioned on a car seat, the protruding parts contact with the car seat and nest into the car seat while a collision occurs to absorb impact from the child safety seat via the protruding parts, and the contacting area between the protruding parts and the car seat is reduced after the foot base is adjusted downward.

14. The child safety seat of claim 13, wherein width of the protruding parts is between 0.125 inch and 0.75 inch.

* * * * *